United States Patent Office 3,435,719
Patented Apr. 1, 1969

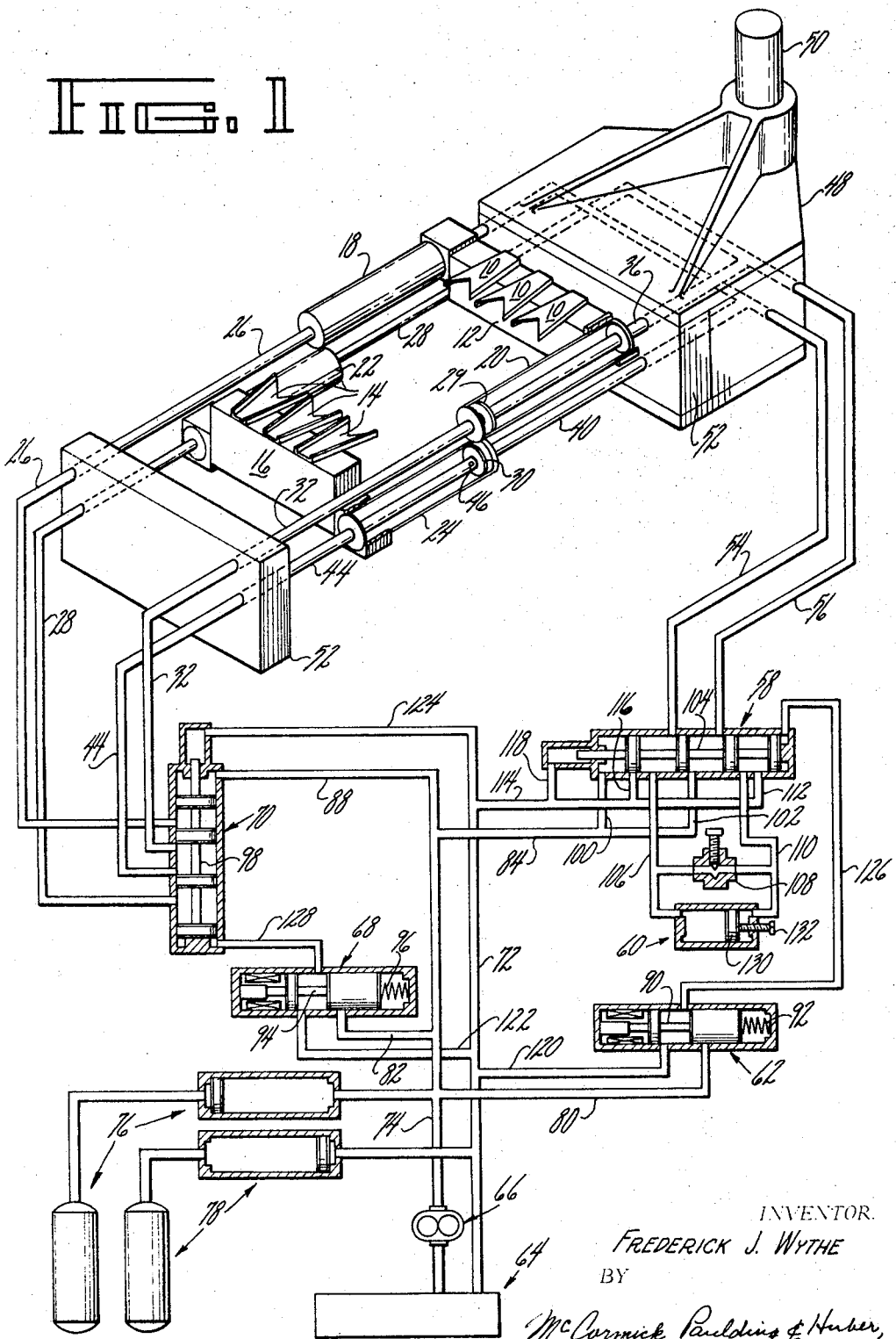

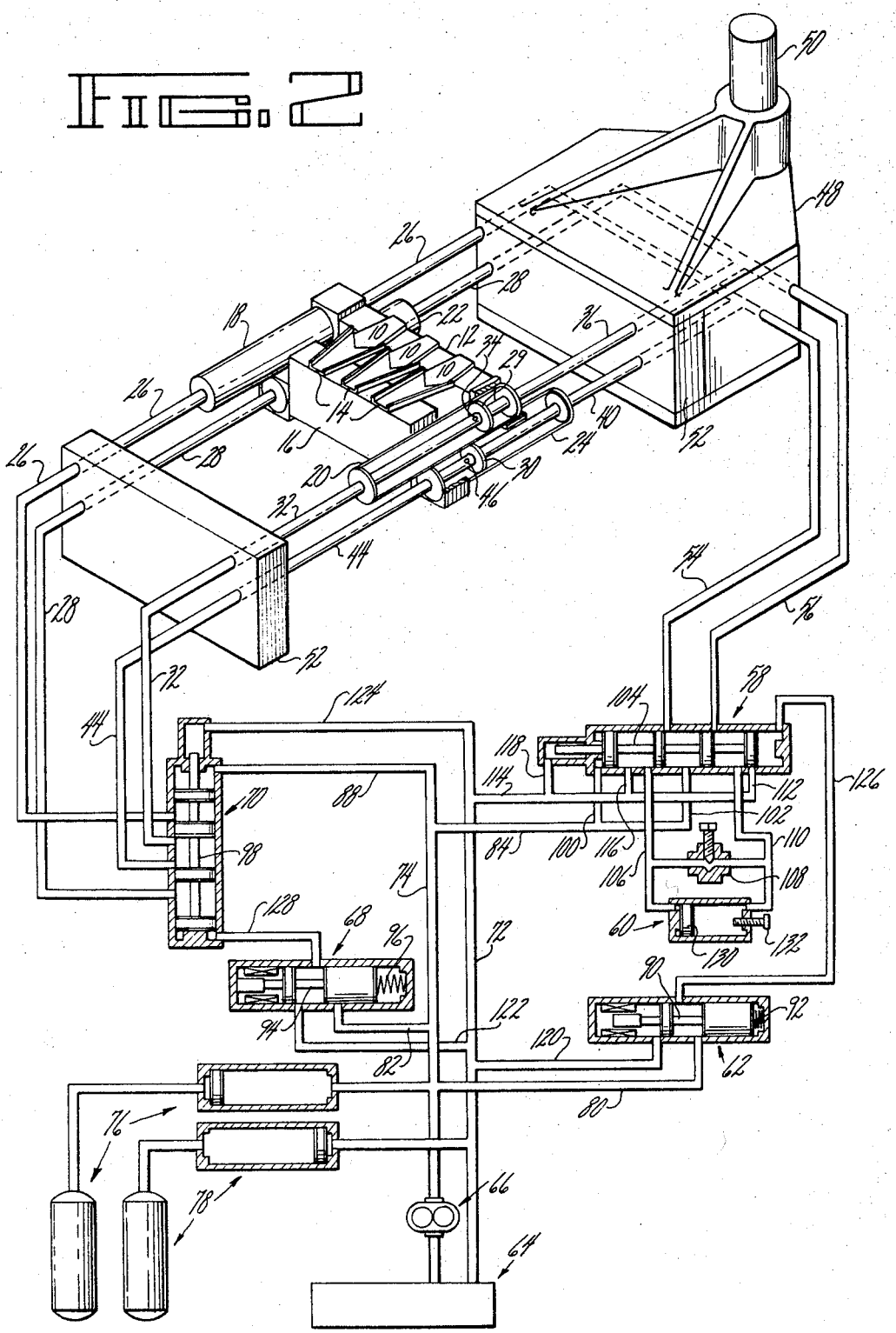

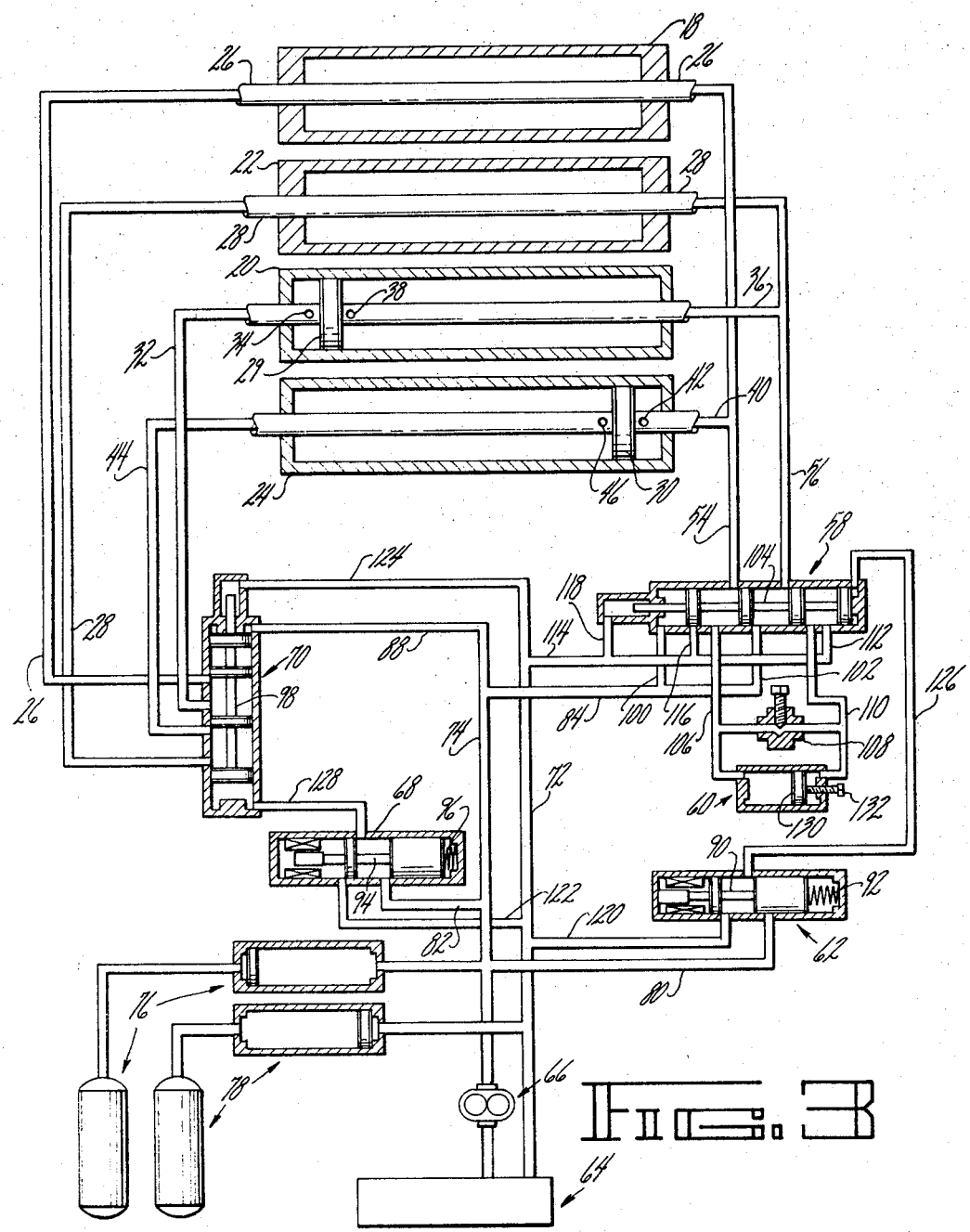

3,435,719
SHEARS FOR MOLTEN GLASS FEEDERS
Frederick J. Wythe, Hebron, Conn., assignor to Emhart Corporation, Bloomfield, Conn., a corporation of Connecticut
Filed Apr. 24, 1967, Ser. No. 633,257
Int. Cl. B26d 5/08, 5/12
U.S. Cl. 83—623                                  12 Claims

ABSTRACT OF THE DISCLOSURE

An hydraulically operated straight line shear structure for association with a molten glass feeder to provide gobs of such glass for glassware forming machines. Each shear of a pair of opposed shears is driven through its cutting stroke by its own reversible hydraulic motor. The motors can be connected in series so that operation of one effects operation of the other to a like degree.

Background of the invention

Shears for cutting discrete gobs of glass issuing from molten glass feeders have been of two types, i.e., pivoted or straight line. In pivoted shear structure, wherein the shear blades are mounted on swinging arms, an undesirable thrust is imparted to the sheared gob, shears scars are likely to appear on the gobs, and satisfactory multiple gobbing is made extremely difficult. That is, the gob farthest out from the shear arm pivot is contacted by the shear blades after the inner gob or gobs and it thus has a longer time to flow through the feeder orifice. This normally produces gobs of different weights and lengths and is generally corrected by reaming one or more of the inner gob orifices.

Straight line shearing overcomes most of the aforesaid disadvantages, and it is particularly adaptable to multiple gob shearing. In straight line shearing, the shear blades advance toward the issuing gobs from opposite directions. Such straight line shear mechanisms are either mechanically actuated or actuated by a combination of fluid motor and mechanical systems.

Summary of the invention

In accordance with the present invention a wholly hydraulically actuated straight line shear structure is provided with the operation of the shear structure on one side of the gobs controlled by and slaved to the operation of the shear structure on the other side of the gobs.

It is the general object of the present invention to provide wholly hydraulic actuation and operation of the shears so as to obtain the benefit of high speed operation with smooth, speed and acceleration controlled cutting and retracting strokes of the shear mechanism.

A more specific object of the invention is to provide in such shear structure for stable blade mounting and adjustment whereby to obtain prolonged shear blade life with a minimum of shear scar on the gobs.

Brief description of the drawings

FIG. 1 is a schematic view of the shear structure and its hydraulic control and actuating system in an "at rest" or open position of the shears.

FIG. 2 is a view similar to FIG. 1, but showing the shears in the closed or "cut" position.

FIG. 3 is a further schematic view of the hydraulic system, showing a "synchronizing" condition.

Description of the preferred embodiment

The shear structure per se which is schematically illustrated comprises one or more (three are shown) shear blades 10 mounted on a right-hand shear head 12 and a similar number of similar blades 14 mounted on a left-hand shear head 16. The shear heads 12 and 16 are referred to as "right-hand" and as "left-hand" for convenience, but it should be understood that in any event they are to be moved toward each other from the "at rest" or open position shown in FIG. 1 during the cutting stroke to the closed or "cut" position shown in FIG. 2. It will be observed that the facing edges of the blades 10 and 14 are notched and that they constitute the cutting or shearing edges of the blades. It will also be observed in FIG. 2, that in the "cut" position the cutting edges of the blades 14, 14 pass over the cutting edges of the blades 10, 10 to sever the gobs, the said gobs having issued from a feeder (not shown) on the vertical center-lines of orifices, which centerlines extend through the blades 10 and 14 at points between the shear heads 12 and 16.

Preferably, the blades 10, 10 are fixedly secured on the shear head 12, while the blades 14, 14 are vertically adjustable relative to the left-hand shear head 16 so as to provide for proper shearing engagement between the blades 10 and 14.

The right-hand shear head 12 comprises part of a carriage having a cylindrical extension 18 and a parallel operating cylinder 20 on the opposite side thereof. The carriage comprising the shear head 12, the cylindrical extension 18 and the operating cylinder 20 is located over a similar carriage structure for the left-hand shear head 16. The said similar carriage structure includes the head 16, a cylindrical extension 22 and an operating cylinder 24. The said carriages and shear heads reciprocate toward and away from each other in the cutting and return stroke of the shear mechanism. The cylindrical extension 18 on the upper carriage guides the said upper carriage in its reciprocatory movement over a horizontally disposed hydraulic conduit 26, and the cylindrical extension 22 on the lower carriage guides its reciprocatory movement over a similarly horizontally disposed hydraulic conduit 28.

The upper and lower operating cylinders 20 and 24 move over fixed pistons 29 and 30 with which they are respectively associated. The upper carriage is moved toward the left in the cutting stroke by introducing hydraulic fluid under pressure to the left side of its fixed piston 29, this being done by admitting the fluid through an hydraulic line 32 having a port 34 (FIG. 3.). At the same time, hydraulic fluid must escape from the operating cylinder 20 on the right-hand side of its associated piston 29 through an hydraulic line 36 having a port 38. When the upper carriage is moved toward the right, or on the return stroke, hydraulic fluid is admitted to the operating cylinder 20 through the line 36 and port 38 while hydraulic fluid is removed through the port 34 and the line 32.

A similar arrangement is provided for the operating cylinder 24 for the lower carriage. That is, to move the lower carriage in the cutting stroke or toward the right, hydraulic fluid under pressure is admitted to the right-hand side of the fixed piston 30 through an hydraulic line 40 having a port 42. At the same time, hydraulic fluid is removed from the operating cylinder 24 on the left-hand side of the piston 30 through a line 44 having a port 46. On the return or retracting stroke of the lower carriage, hydraulic fluid is admitted to the left-hand side of the operating cylinder 24 through the line 44 and port 46 while fluid is removed from the right-hand end of the operating cylinder through the port 42 and the line 40.

The aforementioned hydraulic lines are extended into the shear operating structure through a pair of manifolds at opposite ends of said structure, one such structure being indicated generally by the reference number 48, and it will be observed that it is mounted on a frame post 50. The manifold 58 includes a plate 52 against which the shear head 12 abuts in the retracted position of the upper carriage. The other manifold is not shown but it is similarly constructed to include a plate 52 against which the left-hand shear head 16 rests in the retracted position of the lower carriage.

It is important to observe that in the manifold 48 the right-hand side of the shear structure that the hydraulic line 26 extending through the cylindrical extension 18 of the upper carriage is connected to a line 54 extending from said manifold as is the hydraulic line 40 which is connected to the right-hand end of the actuating cylinder 24 on the lower carriage. Also, the hydraulic line 28 extending through the cylindrical extension 22 on the lower carriage is connected to a line 56 as is the hydraulic line 36 extending from the right-hand side of the operating cylinder 20 for the upper carriage. Thus, we have the hydraulic lines 26, 28, 32 and 44 extending from the left-hand side of the shear structure and the hydraulic lines 54 and 56 extending from the right-hand side of the shear structure. All of these hydraulic lines are utilized in the hydraulic control and actuating system which includes as principal elements a main valve 58, a decelerator 60, a "cut" valve 62, a sump 64, a pump 66, a synchronizing valve 68, and a series-parallel valve 70. These elements of the hydraulic system will be considered in the following description of the operation of the system, having initial reference to FIG. 1 wherein the "at rest" condition is shown.

It will be seen that the sump 64 has a main drain line 72 extending thereto and a main pressure line 74 extending therefrom, the pump 66 being located in the pressure line. A pressure accumulator structure 76 is utilized to maintain a desired pressure in the pressure line 74, and a similar accumulator structure 78 is used to limit the maximum pressure in the drain line 72.

There are four lines 80, 82, 84 and 88 extending from the main pressure line 74 toward the "cut" valve 62, the synchronizing valve 68, the main or control valve 58, and the series-parallel valve 70, respectively. The "cut" valve 62 is solenoid operated and in the "at rest" condition of the system shown its solenoid is not energized whereby its spool 90 is positioned by its spring 92 to block flow through the said cut valve from the pressure lines 74 and 80. The synchronizing valve 68 is also solenoid operated and it is not energized in the "at rest" condition shown whereby its spool 94 is positioned by its spring 96 as shown to block flow of hydraulic fluid through said synchronizing valve at pump or accumulator pressure from the main pressure line 74 and its branch line 82. The branch line 88 extending from the pressure line 74 is connected to the top of the series-parallel valve whereby to position its spool 98 as shown in FIG. 1. This position for the series-parallel valve is the "series" position and it is maintained until such time as the synchronizing valve 68 is energized, as will be described hereinafter.

The pressure branch 84 extending toward the main valve 58 has two side branches 100 and 102 connected with the said main valve. The left-hand branch 100 is connected at the left-hand end of the main valve whereby to move its spool 104 to the right to the position shown in FIG. 1. In this position of the valve spool 104, passage is afforded through the main valve 58 between the lines 56 and 102 whereby to provide hydraulic fluid under pressure to the lines 36 and 28. The line 36 empties into the right-hand end of the operating cylinder 20 for the upper carriage, thus keeping upper carriage and right-hand shear head 12 in the retracted position shown. The hydraulic fluid at pump or accumulator pressure in the line 28 flows in to the series-parallel valve wherein further flow at said pressure is blocked.

By reason of hydraulic fluid being introduced at the pump or accumulator pressure on the right-hand side of the piston 29 associated with the upper operating cylinder 20, fluid is forced from the left-hand side of the said piston out of the said cylinder through the conduit or line 32 opening into the series-parallel valve 70. This fluid from the line 32 passes through the valve 70 and out the line 44 to the left-hand side of the piston 30 in the lower actuating cylinder 24. This, of course, keeps the lower carriage including the left-hand shear head 16 in the retracted position against the plate 52 forming a part of its associated manifold.

From the foregoing description, and due to the "series" condition of the series-parallel valve 70, it can properly be said that the lower operating cylinder 24 and its associated lower carriage are slaved and controlled by the upper operating cylinder 20 and its associated carriage to maintain the open or at rest position of the shear structure.

Fluid exhausting from the right-hand end of the operating cylinder 24 travels through the lines 40 and 54 to the main valve 58 and through it to a line 106. It then passes through a restrictor orifice 108 to a line 110 returning to the main valve 58. It again leaves the main valve 58 through a line 112 connected to the main drain line 72, and it thus passes to the sump 64. The line 112 is a side branch line opening into a branch 114 extending to the main drain 72. Other side branch lines from the valve 58 into the branch 114 are the lines 116 and 118.

The other lines or branches extending to the main drain 72 comprise the lines 120 to the cut or first pilot valve 62, the line 122 to the synchronizing valve 68, and the line 124 to the series-parallel valve 70. The line 120 to the cut valve 62 is connected through that valve to a line 126 extending to the right-hand end of the main valve 58. Thus, in the open position of the shear structure as shown in FIG. 1, there is no hydraulic fluid at pump pressure tending to force the main valve spool 104 toward the left. The line 122 extending to the synchronizing valve 68 is connected through that valve to a line 128 opening into the bottom of the series-parallel valve 70 so that in the condition shown in FIG. 1 there is no hydraulic fluid at pump pressure tending to move the spool 98 of the series-parallel valve upwardly or out of the series position. The drain branch line 124 provides hydraulic fluid at drain pressure to the upper end of the series-parallel valve for venting the top of the spool 98 and the side branch line 118 from the line 114 provides drain pressure at the left-hand end of the main spool 104 for the same purpose.

The hydraulic system is, of course, controlled for timed operation with the feeder. Preferably, this is accomplished by timed relays which can be actuated by movement of the conventional feeder plunger. For example, a relay is provided to operate for a timed period to energize the solenoid for the cut valve 62 so as to move its valve spool 90 toward the right, and this can be done by closing a limit switch at a desired vertical position of the feeder plunger.

When this is done to signal the start of a cut stroke for the shear mechanism, and the cut valve spool 90 is shifted to the right to the position shown in FIG. 2, hydraulic fluid at pump pressure flows from the line 80 through the cut valve 62 into the line 126 extending to the right-hand end of the main valve 58. This forces the main valve spool 104 toward the left because hydraulic fluid at pump pressure is forced against the entire right-hand face of the said spool and thus exerts a greater force on the said spool than that provided by the fluid at pump pressure from the line 100 which is exposed to the smaller left-hand face of the spool 104.

In the left-hand position of the spool 104 for the main valve 58, hydraulic fluid at pump pressure is passed through the said main valve from the branch line 84 and side branch 102 to the line 54 extending to the right-hand manifold 48. This forces fluid at pump pressure in the line 40 into the right-hand side of the lower actuating cylinder 24, thus moving the lower carriage toward the right in the cutting stroke to the position shown in FIG. 2. Fluid at pump pressure is also forced from right to left in the line 26 and thus into the series-parallel valve 70 where its flow is blocked. As the lower actuating cylinder 24 is moved toward the right, fluid is forced from its left-hand end through the line 44 into the series-parallel valve 70 through which it flows into the line 32 extending into the left-hand end of the upper actuating cylinder 20. This, then, causes the right-hand or upper carriage to move from right toward the left in the cutting stroke to the position shown in FIG. 2. Thus, the upper carriage is hydraulically slaved to the lower carriage in the cutting stoke.

During the cutting stroke, the hydraulic fluid that was at pump pressure in the line 36 flowing into the line 56 is permitted to drain through that line and the valve 58 to the line 110. Due to the surge of pressure in the line 110, a substantiall portion of the initial flow by-passes the restrictor orifice 108 and flows into the right-hand end of the decelerator cylinder 60 moving its freely movable piston 130 toward the left to the position shown in FIG. 2 away from an adjustable stop 132. This increased volume afforded in the decelerating cylinder 60 for the flow of fluid permits a rapid traverse of the carriages and shear heads toward the cut position. However, as the cut position is approached, the piston 130 in the decelerator cylinder 60 will hit the left-hand end of said cylinder so that all drain flow must pass through the restrictor oriffice 108 into the line 106 and thus through the main valve 58 to the side branch 116, the branch line 114, to the drain 72. This slows down the final movement of the shearers into the cut position.

When the control relay has timed out and the solenoid for the cut valve 62 is again de-energized, the cut valve spring 92 will again position the cut valve 62 in the position shown in FIG. 1. Immediately that this occurs, the line 126 from the main valve 58 to the cut valve 62 is again connected to drain through the cut valve and the lines 120 and 72. This, of course, permits the hydraulic fluid at pump pressure at the left-hand end of the main valve to move the main valve spool 104 to the right to restore the position shown in FIG. 1.

When the main valve 58 is thus restored to its normal position, fluid at pump pressure flows into the line 56 bringing pump pressure to bear on the right-hand side of the piston 29 in the upper actuating cylinder 20, thereby causing retraction of the upper carriage and also causing retraction of the lower carriage which is slaved thereto and in the manner previously described. Thus, whenever the cut or first pilot valve 62 is de-energized, the shear structure returns automatically to the "at rest" or open position. In this return or actuating stroke of the shear mechanism, hydraulic fluid at pump pressure surges through the line 54 in to the line 106 and this surge of pressure forces the piston 130 in the decelerator cylinder 60 toward the right against the adjustable stop 132. This stop is, of course, adjusted to permit rapid traverse during the initial part of the retraction stroke and to stop such rapid traverse as the shear heads approach the end plates 52, 52. As they do approach the end plates, all drain flow from the line 54 andthe line 106 must pass through the adjustable restrictor orifice 108 into the line 110 and thus through the main valve 58, the side branch line 112, and the branch 114 and the drain line 72 into the sump 64.

As the cylinders 20 and 24 move relative to their associated hydraulic lines 32 and 44 respectively, the fluid between each cylinder and its associated line must be either forced outwardly through the ports 34, 38 and 42, 46, or drawn inwardly therethrough. Therefore, the lines 32 and 44 are arranged to form a loop through which excess fluid can be fed into the series-parallel valve 70 or outwardly therefrom. Preferably this exchange is made in a synchronized manner to prevent the cylinders from getting out of phase with one another. From FIG. 1 it can be seen that fluid in line 32 can flow into the series-parallel valve and be received in line 44 as the cylinders retract the shear mechanism, and that fluid in line 44 and flow into line 32 in the same manner during cutting motion of the cylinders. A synchronizing valve 68 is operated or energized for a brief timed period during each complete cycle including a cutting and retracting stroke of the shear mechanism. Preferably, the energization of the synchronizing valve is controlled by the feeder plunger to occur and to have the synchronizing valve thereafter de-energized just prior to energizing the cut valve 62 for the cutting stroke.

The synchronizing condition is shown in FIG. 3 and it will be observed that when the synchronizing valve solenoid is energized, the synchronizing valve spool 94 is moved toward the right. This connects the line 128 to hydraulic fluid at pump pressure through the lines 82 and 74, and the fluid at pump pressure is introduced to the bottom of the series-parallel valve 70. This forces the valve spool 98 upwardly in the said series-parallel valve because of the larger spool face at the bottom of the spool than is provided at the top.

When the series-parallel valve spool 98 reaches its upper position shown in FIG. 3, the lines 32 and 44 are no longer connected at the valve. Thus, the slave connection between the upper and lower operating cylinders 20 and 24 is severed. In place of the previously established "series" slave connection, there is established at the series-parallel valve 70 a "parallel" slaved condition by connecting the line 32 to the line 26 and by connecting the line 44 to the line 28. Thus, the left-hand end of the upper actuating cylinder 20 and the right-hand end of the lower actuating cylinder 24 are both connected to drain to be certain that the upper and lower carriages and operating heads are fully retracted. When this has been accomplished, during a preselected timed period, the synchronizing valve solenoid 68 is again de-energized, permitting the series-parallel valve to be restored to the position shown in FIG. 1 in preparation for the next cycle of operation commencing with a cutting stroke. By thus fully retracting both operating heads prior to each successive cutting stroke, the cutting heads are not permitted to get out of phase or timed relationship with each other.

I claim:

1. A gob shears for a molten glass feeder comprising a pair of opposed shear carriages movable toward and away from each other between open and shearing positions, an hydraulic system for operating the carriages including a reversible fluid motor associated with each carriage and comprising a fixed part and a movable part, one of which parts is movable with is associated carriage, hydraulic line connections between said fluid motors including valve means which is normally positioned to effect a series connection between said fluid motors so that operation of one fluid motor to move its associated carriage in one direction will cause the other fluid motor to move its associated carriage in the opposite direction, the system further including control valve means to selectively move said carriages toward and to maintain them in open position and to move said carriages toward and to maintain them in gob shearing position, and means operable in timed relationship with the feeder for actuating said control valve means.

2. A shears as defined in claim 1 wherein each of said fluid motors comprises a fixed piston and an actuating cylinder connected to and movable with its associated carriage.

3. A shears as defined in claim 2 wherein each of said actuating cylinders is disposed adjacent one end of its associated carriage, and wherein guide means is provided at the opposite end of each of said carriages for restraining said carriages to parallel movement toward and away from one another.

4. A shears as defined in claim 1 wherein an adjustable restriction is provided, said valve means being effective to direct drain fluid from both fluid motors through said restriction to control the speed of movement of said carriages between said open and shearing positions.

5. A shears as defined in claim 4 wherein a decelerator cylinder is connected at its ends in by-pass relationship with said adjustable restriction and has a freely movable piston therein to provide for increased initial flow of hydraulic fluid during movement of said carriages in either direction between said open and shearing positions whereby initial movement of said fluid motors is accomplished at one speed and final movement at a slower speed.

6. A shears as defined in claim 4 wherein said decelerator cylinder is connected at its ends in by-pass relationship with said restriction and has a freely movable piston therein to provide for relatively high initial flow of hydraulic fluid to the drain line during initial movement of said carriages in either direction between said open and shearing positions whereby such initial movement is at one speed and final movement at a slower speed, and an adjustable stop for limiting the movement of said piston in said decelerator cylinder in both directions to fix the length of movement of said carriages at said one speed.

7. The shears set forth in claim 2 wherein said valve means comprises a two-position valve which is operable to move from a first position corresponding to said series connection to a second position to effect a parallel connection between said actuation cylinders wherein each of said actuating cylinders at one end is connected to said control valve means with a pressure line and at the other end with a drain line.

8. The shears as defined in claim 6 wherein said control valve means comprises a two-position valve which is operable to move from a first position corresponding to the open position of said carriages to effect a connection of said decelerator cylinder and associated restriction in a first line of said hydraulic system which line is at drain pressure to a second position corresponding to the closed position of said carriages to effect a connection of said decelerator cylinder and associated restriction in a second line of said hydraulic system which line is at drain pressure, whereby a single decelerator cylinder is effective to vary the speed of movement of said carriages in both directions.

9. The shears defined in claim 3 wherein said valve means comprises a two-position valve operable to move from a first position to a second position to effect a parallel connection between said actuating cylinders wherein said control valve means connects one end of each actuating cylinder to a pressure line and the other end to a drain line, said two-position valve being operable to move to its second position and to then return it to its first position while said carriages are in their open position, whereby to assure that each such carriage is in its fully open position prior to movement toward the shearing position.

10. The shears defined in claim 4 wherein said valve means comprises a two-position valve operable to move from a first position to a second position to effect a parallel connection between said fluid motors wherein said control valve means connects one end of each fluid motor to a pressure line and the other end to a drain line, said two-position valve being operable to move to its second position and to then return it to its normal position while said carriages are in their open position, whereby to assure that each such carriage is in its fully open position prior to movement toward the shearing position.

11. The shears defined in claim 5 wherein said valve means comprises a two-position valve operable to move from a first position to a second position to effect a parallel connection between said fluid motors wherein said control valve means connects one end of each fluid motor to a pressure line and the other end to a drain line, said two-rosition valve being operable to move to its second position and to then return it to its first position while said carriages are in their open position, whereby to assure that each such carriage is in its fully open position prior to movement toward the shearing position.

12. The shears defined in claim 6 wherein said valve means comprises a two-position valve operable to move from a first position to a second position to effect a parallel connection between said actuating cylinders wherein said control valve means connects one end of each actuating cylinder to a pressure line and the other end to a drain line, said two-position valve being operable to move to its second position and to then return it to its first position while said carriages are in their open position whereby to assure that each such carriage is in its fully open position prior to movement toward the shearing position.

References Cited

UNITED STATES PATENTS

| 2,090,082 | 8/1937 | Wadsworth | 83—623 X |
|---|---|---|---|
| 2,760,569 | 8/1956 | Suerken | 83—623 X |
| 2,905,112 | 9/1959 | Sevigny | 83—623 |
| 2,977,718 | 4/1961 | Dahlman | 83—600 |
| 3,081,659 | 3/1963 | Theobald | 83—623 X |

ANDREW R. JUHASZ, *Primary Examiner.*

FRANK T. YOST, *Assistant Examiner.*

U.S. Cl. X.R.

83—639